March 14, 1961  J. B. FORREST  2,974,662
ADJUSTABLE GRILL
Filed March 8, 1956  2 Sheets-Sheet 1

INVENTOR:
JOSEPH B. FORREST.
BY Eaton, Bell, Hunt & Seltzer
ATTORNEYS

March 14, 1961

J. B. FORREST 2,974,662

ADJUSTABLE GRILL

Filed March 8, 1956

INVENTOR:
JOSEPH B. FORREST.

BY Eaton, Bell, Hunt & Seltzer

ATTORNEYS

United States Patent Office 2,974,662
Patented Mar. 14, 1961

2,974,662

ADJUSTABLE GRILL

Joseph B. Forrest, 305 N. Poplar St., Charlotte, N.C.

Filed Mar. 8, 1956, Ser. No. 570,254

4 Claims. (Cl. 126—30)

This invention relates to grills and, more particularly, to a portable and adjustable grill particularly designed for being used outdoors.

It is the primary object of this invention to provide a portable grill comprising an upright supporting member or post and a pair of grids or shelves suspended therefrom in right angular relation when in operating or extended position and wherein means are provided for varying the position of the grids as desired.

It is another object of this invention to provide a device of the type described wherein means are provided for frictionally locking each of the shelf members at any desired point on either side of the vertical support.

It is still another object of this invention to provide a device of the type described wherein the grids may be readily folded parallel to the supporting post for shipping or storage and ease of carrying, in which position the device occupies a minimum of space.

It is still another object of this invention to provide a device of the type described wherein means are provided for readily removing the shelves from the supporting member for any desired purpose such as cleaning or replacement.

It is still another object of this invention to provide a device of the type described wherein means are provided for mechanically locking the shelves to the upright supporting member in folded position to facilitate packing and storing of the grill, said locking means being operative automatically upon the shelves being folded into parallel relation with the upright supporting member adjacent opposite side surfaces thereof.

A further object of the invention is to provide a portable and adjustable grill which, in addition to the advantages noted above, has the additional advantage of simplicity of design which readily lends itself to ease of manufacture and operation. The manufacture and operation of the grill is facilitated by the omission of bolts and extensible members which have characterized prior attempts to provide a portable adjustable grill.

Some of the objects of the invention having been stated, other objects will appear as the description proceeds when taken in connection with the accompanying drawings, in which—

Figure 5 is a view similar to Figure 1 but with the lower portion of the supporting member broken away and showing the shelves in fully closed or inoperative position for storage;

Figure 6 is an enlarged isometric view with parts broken away and showing the supporting member in phantom lines and illustrating the manner in which the upper shelf is frictionally locked to the supporting member;

Figure 7 is a horizontal sectional view taken substantially along line 7—7 in Figure 1;

Figure 8 is a horizontal sectional view taken substantially along the line 8—8 in Figure 1;

Figure 9 is an enlarged vertical sectional view taken substantially along the line 9—9 in Figure 5;

Figure 1:
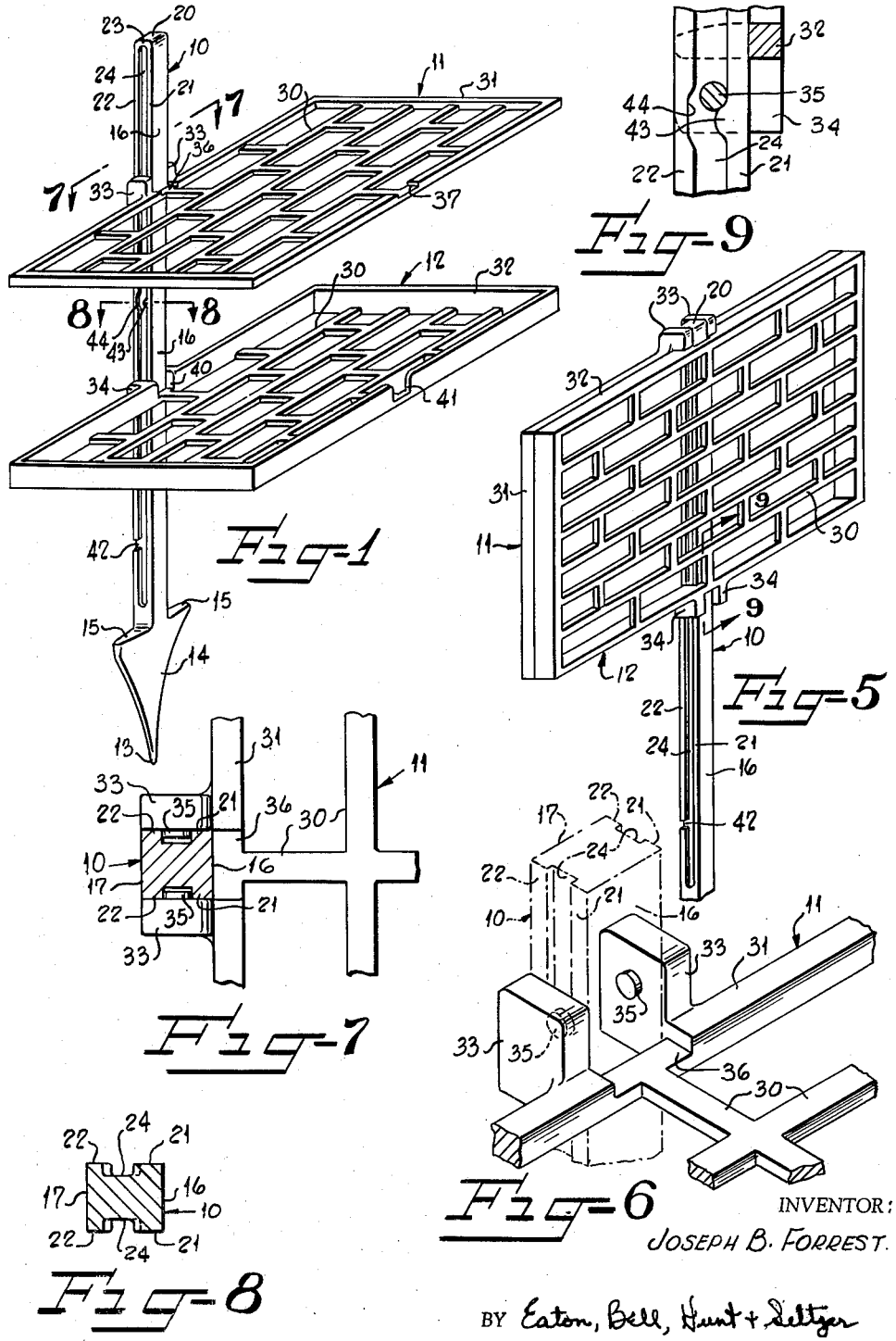
Figure 1 is an isometric view looking down on the grill and showing the shelves superposed for one operating position.

Referring more specifically to the drawings, it will be observed that the portable grill comprises an upright supporting member or shaft, broadly indicated at 10, from which are adjustably suspended in a cantilever manner upper and lower shelves or grid members 11 and 12, respectively.

The portable grill of the present invention is particularly adapted for outdoor use and is supported by driving a sharpened or pointed end 13 of the support or shaft 10 into the ground. A flat web 14 tapers upwardly and outwardly from the pointed end 13 to define abutments or shoulder portions 15 extending outwardly from the body portion of the support 10 whereby the pointed end 13 may be readily pressed or driven into the ground. The shape of the web 14 provides lateral support to the grill to prevent the same from falling or tilting over from either of the operating positions shown in Figures 1 and 10.

The support 10 also includes front and rear walls 16 and 17, respectively, which extend upwardly from the shoulder portions or abutments 15 and are joined at the top of the support 10 by a rounded or arcuate bridge or top portion 20. Front and rear shoulders 21 and 22 extend laterally from opposite sides of the front and rear walls 16 and 17, respectively, said shoulders 21 and 22 being spaced inwardly toward each other an equal distance from their respective front and rear walls so that the front surfaces of shoulders 21 are flush with the surface of the front wall 16 and the rear surfaces of shoulders 22 are flush with the surface of rear wall 17. Thus, as shown in the drawings, the shoulders 21 and 22 serve as lateral extensions of their respective front and rear walls 16, 17 to provide smooth, unbroken surfaces on the front and rear of the shaft or support 10.

The top or bridge 20 is also provided with laterally extending shoulders 23 which join the front and rear shoulders 21 and 22 on respective sides of the shaft 10. The shoulders 23 conform to the configuration of the top 20 and are of the same dimensions as shoulders 21 and 22.

The shoulders 21, 22 define longitudinally extending grooves, trackways or guides 24 therebetween in each side of the shaft 10. The lower ends of the guides 24 are defined by the juncture of shoulders 21 and 22 with the body portion of the shaft 10 adjacent the shoulder portions or abutments 15, and the upper ends of the guides 24 are defined by the shoulders 23.

Each of the grids or shelves 11 and 12 is made up of a lattice work of interconnected grid elements 30, the grid elements in the shelf 11 being circumscribed by a frame 31 extending a slight distance above the grid elements 30 as viewed in Figure 1. The grid elements 30 in the shelf 12 are circumscribed by a frame 32 extending a substantial distance above the grid elements 30 as viewed in Figure 1. It is contemplated that the grid 12 will normally be utilized to hold wood, charcoal or any other combustible heat producing material, and one reason for having the frame 32 extending above the grid elements 30 is to assist in holding the combustible material on the grid 12. The grid 11 will normally support the meat or other substance to be cooked, and therefore the frame 31 needs only to extend above the grid elements a small distance. If deemed advisable, however, the frames 31 and 32 may be of the same size. This would simplify manufacture since the grids 11 and 12 are otherwise identical and could therefore be cast in the same mold.

A pair of lugs or ears 33 are disposed astraddle the center point on one longitudinal edge of the frame 31, and a like pair of lugs 34 are similarly disposed on the frame 32, each pair of lugs 33 and 34 being preferably formed integral with its associated frame 31 or 32 and extending outwardly therefrom.

Each pair of lugs 33 and 34 preferably extends from its associated frame 31 or 32 a distance substantially equal to the distance between the outer surfaces of the front and rear walls 16 and 17 on the shaft 10, and is of a width equal to the width of the side surfaces of the frame 32 on the grid 12. As most clearly seen in Figures 1, 5 and 6 the pair of lugs 33 on the grid 11 are of a greater width than the side surface of the frame 31 so that said lugs 33 overhang the frame 31 when the grid 11 is disposed in a vertical plane or closed position as shown in Figure 5.

Pins or grid guides 35 extend inwardly toward each other from the proximal surfaces of each pair of lugs 33 and 34, each of said pins 35 being centrally disposed on its respective lug, and as most clearly seen in Figure 7, the proximate surfaces of the pins 35 in each pair of lugs are spaced apart a distance slightly greater than the lineal distance between the opposed guides or trackways 24 in the shaft 10, but less than the overall width of the shaft 10 so that the pins 35 are adapted to be slidably confined in the trackways 24. It will also be noted in Figure 9 that the diameter of each of the pins 35 is only slightly less than the width of the trackways 24.

A portion of the frame 31 (Figures 1 and 7) is cut away adjacent the lugs 33 to define a notch 36 therein, there being a similar notch 37 provided in the central portion of the frame 31 opposite the lugs 33. The frame 32 is notched in a similar manner at 40 and 41, and as shown in the drawings the notches 36, 37 and 40, 41 are formed in what is to be the upper surface of the respective frames 31 and 32 when the grids 11 and 12 are in horizontal or operative position. The notches 36, 37 and 40, 41 are of sufficient depth to permit their respective grids 11 and 12 to nest against opposite surfaces of the support 10, as shown in Figure 5.

In order to permit the pins 35 on the grids 11 and 12 to be introduced into the trackways 24 on the shaft or support 10, each of the rearmost shoulders 22 is interrupted by a transverse groove or passageway 42, only one of which is shown in Figure 1. Each of the passageways 42 communicates with the surface of the rear wall 17 and with one of the trackways 24, said passageways being equally spaced above the lower terminal point of the trackways 24 a distance at least as great as the combined width of the side surfaces of the frames 31 and 32.

In order to support the grids 11 and 12 in vertical closed position adjacent opposite surfaces of the upper portion of the shaft 10 for storage, as shown in Figure 5, the rear surface of each of the forward shoulders 21 adjacent the trackways 24 is provided with a projection 43, as shown in Figure 9, which extends into the path of movement of the pins 35 on the grid 12 and prevent the grid 12 from moving downwardly on the shaft 10 when the grid is vertically disposed against the shaft. The lugs 33 of the grid 11 overlie the upper edge of the frame 32 of the grid 12 for the grid 11 to thus be supported thereby in closed position. The projections 43 are disposed between the passageways 42 and the top 20 of the shaft. In order to permit the grids 11 and 12 to be moved past the projections 43 in assembling and disassembling the grill, cut-outs or notches 44 are formed in the proximate surfaces of the rear shoulders 22. The cut-outs 44 serve as transverse extensions of the longitudinal trackways 24 thereby permitting the pins 35 to bypass the projections 43 when assembling or disassembling the grill.

The method of assembling the grill into the operating position shown in Figure 1 is accomplished by first attaching the grid 12 to the support 10. The pins 35 in the lugs 34 are guided into the trackways 24 through the passageways 42 with the grid 12 in inverted position as shown in dotted lines in Figure 2; that is, with the frame 32 extending downwardly. The inverted grid 12 is then slid upwardly along the rear wall 17 the entire length of the support 10 until the pins 35 engage the shoulder 23, at which point the grid 12 is pivoted about the top 20 so as to present the grid 12 in upright or operative position along the front wall 16 of the support 10. The grid 12 is then passed downwardly along the front wall 16 of the shaft 10 beyond the passageways 42 until the pins 35 engage the lower extremity of the trackways 24 as shown in solid lines in Figure 2.

The grid 11 is then inverted and introduced into the trackways 24 through the passageways 42 and passed upwardly along the rear wall 17 as shown in dotted lines in Figure 3 in the same manner as heretofore described in connection with grid 12. The grid 11 is then pivoted about the top 20 to operative position as shown in solid lines in Figure 3 and positioned at a desired location along the front wall 16 adjacent the top of support 10 as shown in Figure 1. The grid 12 may then be elevated along the front wall 16 from the position shown in solid lines in Figures 2 and 3 to a desired point on the support 10 relative to the grid 11 such as shown in Figure 1. After the sharpened end 13 of the support 10 is embedded in the ground the grill is then ready for operation.

Figure 2:
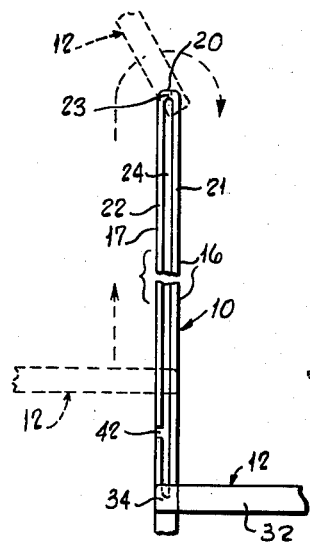
Figure 2 is a side elevation of the grill showing in dotted lines the manner in which the lower shelf is initially positioned on the upright support and thereafter moved to the position shown in solid lines.
Figure 3:
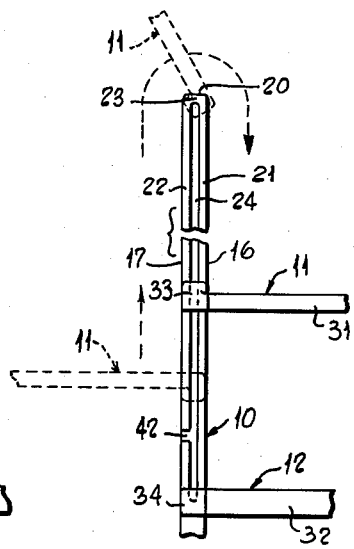
Figure 3 is a side elevation of the grill similar to Figure 2 and showing in dotted lines the manner in which the upper shelf is initially positioned on the upright support and thereafter moved to the position shown in solid lines.

In order to disassemble the grill, the grids 11 and 12 are successively pivoted about the top 20 in a reverse manner from that shown in Figures 2 and 3 and passed downwardly along the rear wall 17 to a point where the pins 35 may be passed through the passageways 42 to separate the grids 11 and 12 from the support 10.

Figure 10:
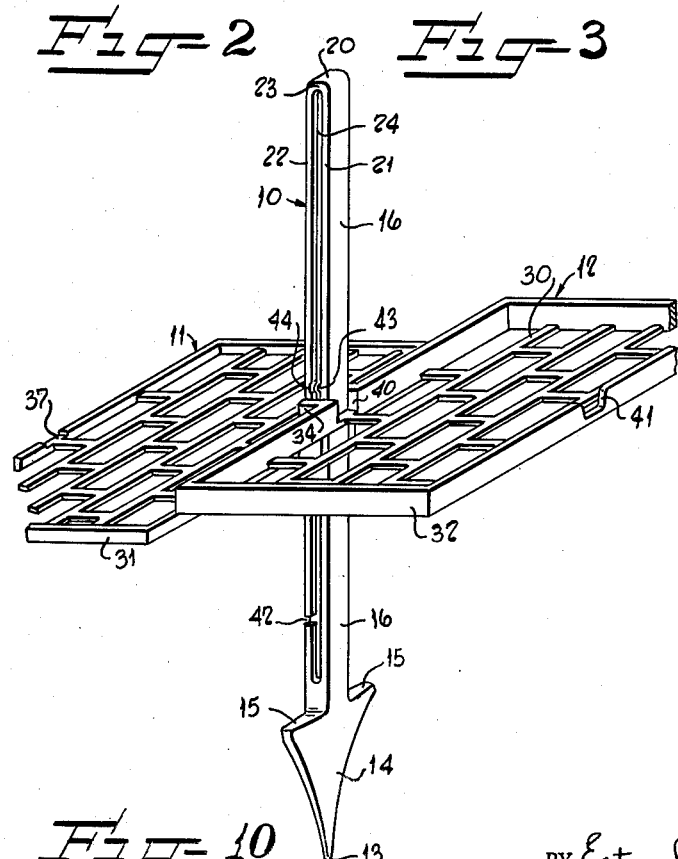
Figure 10 is an isometric view of the portable grill similar to Figure 1 but showing the shelves in a different operating position.

It is important to a proper understanding of the invention to bear in mind that the grids 11 and 12 must be held at an angle of less than ninety degrees relative to the support 10 when causing the pins 35 to traverse the trackways 24, such as in the assembly or disassembling of the grill. The reason for this is clear when it is understood that the pins 35 are so arranged in their respective lugs 33 and 34 that the grids 11 and 12 are frictionally locked against movement relative to the support 10 when said grids are extended to right angular relation to the support 10 as shown in Figures 1 and 10.

It has been heretofore noted that each of the pins 35 is centrally disposed in its respective lug 33 and 34, and this necessarily results in the pins on the grid 11 being spaced above the portion of the frame 31 which defines the bottom of notch 36 as shown in Figure 6. It is the side surface portion of frame 31 below the notch 36 which engages the front wall 16 of shaft 10 to maintain the grid in perpendicular or cantilever relation to the shaft. The distance from the pins 35 to the proximal side surface of the frame 31 is such that as the frame 31 is moved into engagement with the front wall 16 of the shaft 10, the pins 35 engage the front shoulders 21 at a point above the engagement of the frame 31 with the front wall 16. The weight of the grid alone is thus sufficient to cause a binding or frictional locking of the grid 11 to the support 10.

The pins 35 carried by the grid 12 are similarly positioned relative to the frame 32 so that the grids 11 and 12 are frictionally locked at any desired point along the front wall 16 of shaft 10 in an identical manner as the grid 11.

Although the grill is preferably assembled with the grids 11 and 12 extending outwardly from the front wall 16 of the shaft 10 wherein the grids may be positioned at any point along the trackways 24, it is to be understood that they may instead be suspended from the rear wall 17 if desired, the only limitation being that the lowermost grid must be positioned a sufficient distance from the passageways 42 to insure that pins 35 will not enter the same and cause the grid to drop or fall out of engagement with the trackways 24.

In assembling the grill so that the grids 11 and 12 are suspended from the rear wall 17, the grid 11 is first attached in upright or operative position, with its frame 31 extending upwardly, to the shaft 10 by introducing the pins 35 into the trackways 24 through the passageways 42. The grid 11 is then elevated along wall 17 to a desired point where it is frictionally locked by allowing it to assume a perpendicular attitude relative to the shaft 10. The grid 12 is then attached and locked to shaft 10 in a similar manner at a desired point beneath grid 11.

This alternate method of assembling the grill is satisfactory but does not provide the safety which is achieved in the preferred method. By suspending the grids 11 and 12 from the front wall 16, remote from passageways 42, there is no possibility of the grids being accidentally separated from the shaft. Such an accident could occur if the grids are suspended from rear wall 17 and are inadvertently unlocked by tipping during the cooking operation.

Once the grill is assembled by either of the above methods, it can be folded into a compact package without removing the grids from their support. The following description of folding the grill assumes that it has been assembled with the grids suspended from the front wall 16 as shown in Figure 1, but it is believed sufficient for an understanding of the steps employed in folding the grill when the grids are suspended from the rear wall 17.

Figure 4:
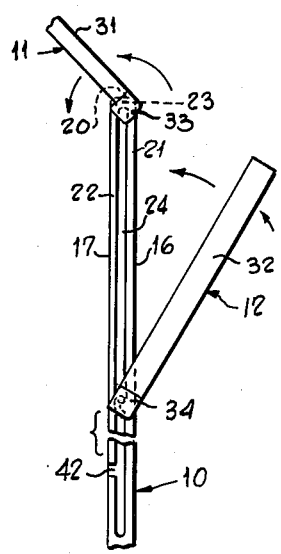
Figure 4 is a side elevation of the grill and showing the upper and lower shelves in a partially folded position with respect to the upright support.

The first step in folding the grill from the operative position shown in Figure 1 to the storage position shown in Figure 5 is to pivot the grid 11 about the top 20 as shown in Figure 4 into parallel juxtaposition with the rear wall 17 so that the notch 37 in the frame 31 receives the shaft 10. The grid 12 is then moved upwardly until the pins 35 pass above the projections 43 on shoulders 21 at which time the grid is folded upwardly as shown in Figure 4 into parallel juxtaposition with the front wall 16 wherein the notch 41 receives the shaft 10.

The projections 43 are spaced from the top end of the trackways 24 a distance substantially equal to the overall width of the grid 12, including the lugs 34, so that upon the pins 35 on grid 12 engaging the projections 43 as shown in Figure 9, the remote edge of frame 32 will engage the proximate surfaces of the lugs 33 carried by the grid 11 as shown in Figure 5. Thus, the projections 43 support the grid 12 in folded position adjacent the wall 16 of the shaft 10 and the grid 12, in turn, supports the grid 11 in folded position adjacent the wall 17. When the grid 12 is vertically disposed and the projections 43 are supporting the pins 35 thereof as shown in Figures 5 and 9, the notches 40 and 41 in the grid frame 32 have their bottom walls vertically disposed in engagement with the wall 16 of the shaft 10 to prevent the pins 35 from moving inwardly further and overriding the projections 43.

It will also be noted in Figure 9 that the projections 43 extend a sufficient distance into trackways 24 to block the movement of and engage the pins 35 carried by grid 12 if grid 12 is folded into storage position along the rear wall 17 instead of the front wall 16 as shown in Figure 5.

Figure 11:
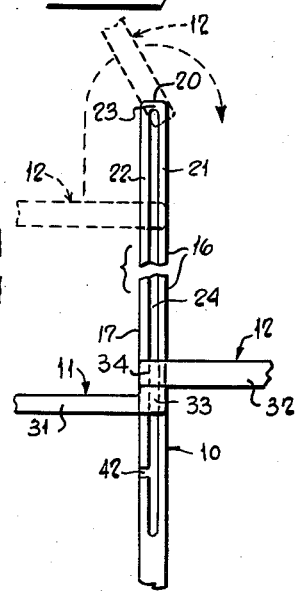
Figure 11 is a side elevation of the grill device showing the manner in which the shelves are initially positioned relative to each other on the upright support and thereafter moved to attain the operating position of Figure 10.

For some occasions it is desirable to employ the grill in the operating position shown in Figure 10 as when cooking a large quantity of meat. In this position, the grids 11, 12 extend from opposite side surfaces of the shaft 10 and would support the meat with the shaft 10 positioned in the middle of the fire or source of heat therebelow. Figure 11 illustrates the manner in which the grill is assembled into the operating position of Figure 10, and it will be observed that grid 12 is positioned on one side of the shaft 10 in inverted position and moved to upright position on the opposite side of the shaft. Now, grid 11 is positioned on the shaft 10 in upright position with its lugs 33 engaging the proximal surface of the lugs 34, on the grid 12. It is apparent that the grid 11 may be positioned below the grid 12 out of contacting engagement therewith as for example when it is desired to cook a steak on the grid 11 a greater amount than a steak on the grid 12 to satisfy the individual taste.

Accordingly, there has been disclosed a portable grill having a shaft normally maintained in upright position from which a plurality of freely interchangeable shelves or grids are adjustably suspended for various operating positions and wherein the shelves are adapted to fold against opposite side surfaces of the shaft to present a compact grill for storage.

In the drawings and specification there has been set forth a preferred embodiment of the invention, and although specific terms are employed, they are used in a generic and descriptive sense only and not for purposes of limitation, the scope of the invention being defined in the claims:

I claim:

1. A grill for outdoor use comprising a rectangular shaft, a pair of grids carried by said shaft, said shaft having front and rear walls and a pointed end adapted to be embedded in the ground to support said grill in operative position, shoulders extending laterally from the edges of the front and rear walls and defining longitudinal trackways in the side surfaces of the shaft, said trackways having enclosed ends, each of said grids including an open latticework of interconnected grid members and a frame surrounding said grid members, a pair of lugs extending from one edge of the frame of each grid and straddling the trackways in the side surfaces of said shaft, pins extending toward each other from the proximal surfaces of each pair of lugs and terminating in spaced relation to each other, the distance between each of the frame edges adjacent the lugs and the centers of the pins being substantially the same as the distance between the centers of the trackways and the front wall of the shaft, said pins being slidably and pivotally confined within said trackways, each of said frames having oppositely disposed notches provided in medial locations along its forward and rearward portions respectively for receiving said shaft upon each of said grids being pivoted into parallel relationship with respect to said shaft to present a compact grill, and transverse passageways communicatively connected to the trackways to permit the grids to be disengaged from the shaft.

2. A grill for outdoor use comprising a rectangular shaft, a pair of grids carried by said shaft, said shaft having front and rear walls and a pointed end adapted to be embedded in the ground to support said grill in operative position, shoulders extending laterally from one of the edges of the front and rear walls respectively and defining a longitudinal trackway in one side surface of the shaft, said trackway having enclosed ends, each of said grids including an open latticework of interconnected grid members and a frame surrounding said grid members, a lug extending from one edge of the frame and straddling the trackway in the side surface of said shaft, a pin extending from said lug within said trackway for slidable and pivotal movement therein, the distance between the frame edge adjacent the lug and the center of the pin being substantially the same as the distance between the center of the width of the trackway and the front wall of the shaft, and said frame having oppositely disposed notches provided in medial locations along its forward and rearward portions respectively for receiving said shaft upon each of said grids being pivoted into parallel relationship with respect to said shaft to present a compact grill, and one of said shoulders being provided with a passageway angularly disposed and communicatively connected to the trackway to permit the grids to be disengaged from the shaft.

3. A grill comprising a rectangular shaft having a pointed end adapted to be forced into the ground, longitudinal trackways having enclosed ends positioned on the sides of said shaft, a plurality of grids carried by said shaft and normally extending outwardly therefrom in a plane transverse to said shaft, each of said grids comprising an open latticework of interconnected grid members and a frame surrounding said grid members, trackway engaging means carried by each of said grids for vertically guiding and pivotally mounting said grids on said shaft, passageways communicatively connected to said trackways to permit said grids to be disengaged from said shaft, and the frame of each grid having oppositely disposed notches positioned in the medial portions of the front and rear walls thereof respectively, whereby upon each of said grids being pivoted parallel to said shaft, the shaft will be received in said notches to present a compact grill.

4. A grill comprising an upright shaft having front and rear elongated surfaces and being provided with a longitudinal trackway in one side thereof, a grid carried by the shaft in substantially perpendicular relationship with respect thereto when in operative position, said grid comprising a frame having a lug straddling the trackway in said shaft, means extending inwardly from said lug into the trackway for pivotally mounting and slidably guiding said grid, said frame having a first notch provided in the medial portion of the side adjacent said lug, the oppositely disposed side of said frame having a second notch provided in a medial portion thereof in alinement with the first notch, said notches having respective widths slightly greater than the distance between the sides of said shaft, and said grid being movable upwardly along one of the front and rear surfaces of the shaft to the top thereof and pivotable into inoperative folded position in engagement with the other of said front and rear surfaces, said notches receiving spaced portions of said shaft therein to afford a parrallel relationship between said grid and said shaft.

References Cited in the file of this patent

UNITED STATES PATENTS

| | | |
|---|---|---|
| 313,940 | Kehoe | Mar. 17, 1885 |
| 460,782 | Mark | Oct. 6, 1891 |
| 758,015 | Miller | Apr. 19, 1904 |
| 1,173,036 | Robidoux | Feb. 22, 1916 |
| 1,276,677 | Mittleburg | Aug. 20, 1918 |
| 2,058,172 | Myers | Oct. 20, 1936 |
| 2,173,024 | Park | Sept. 12, 1939 |
| 2,215,884 | Runge | Sept. 24, 1940 |
| 2,441,190 | Fuller | May 11, 1948 |
| 2,814,286 | Arnold | Nov. 26, 1957 |

FOREIGN PATENTS

| | | |
|---|---|---|
| 174,178 | Austria | Mar. 10, 1953 |
| 567,564 | Great Britain | Feb. 20, 1945 |
| 308,813 | Great Britain | of 1930 |
| 212,681 | Great Britain | Mar. 20, 1924 |